United States Patent
Quinn et al.

(10) Patent No.: US 8,254,840 B2
(45) Date of Patent: Aug. 28, 2012

(54) AUTO CONFIGURATION FOR A DIAL-UP NETWORKING SYSTEM

(75) Inventors: Michael J. Quinn, Troy, MI (US); David P. Pop, Garden City, MI (US); Anthony G. Lobaza, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 12/954,195

(22) Filed: Nov. 24, 2010

(65) Prior Publication Data

US 2012/0129494 A1 May 24, 2012

(51) Int. Cl.
*H04B 7/00* (2006.01)

(52) U.S. Cl. ............... 455/41.2; 455/3.01; 455/3.06; 455/41.3; 455/411; 455/414.1; 455/550.1; 455/552.1; 455/553.1; 455/556.1; 455/556.2; 455/557; 370/252; 370/338; 370/349; 370/351; 370/310; 370/401; 709/226; 709/227; 709/228; 709/229; 709/230; 709/231; 709/232; 709/238; 709/246

(58) Field of Classification Search ............. 455/3.01, 455/3.06, 41.2, 41.3, 411, 414.1, 414.4, 550.1, 455/552.1, 553.1, 556.1, 556.2, 557; 370/252, 370/310, 338, 349, 351–356, 401; 709/225–232, 709/238, 246
See application file for complete search history.

(56) References Cited

U.S. PATENT DOCUMENTS

| | | | | |
|---|---|---|---|---|
| 7,389,334 B2 * | 6/2008 | Giliberto et al. | ............. | 709/222 |
| 7,463,861 B2 * | 12/2008 | Eisenbach | ............. | 455/41.2 |
| 7,551,593 B2 * | 6/2009 | Haller et al. | ............. | 370/338 |
| 7,796,572 B2 * | 9/2010 | Do et al. | ............. | 370/338 |
| 7,925,212 B2 * | 4/2011 | Eisenbach | ............. | 455/41.2 |
| 7,979,028 B2 * | 7/2011 | Matsuda | ............. | 455/41.2 |
| 8,112,037 B2 * | 2/2012 | Ketari | ............. | 455/41.3 |
| 2005/0048919 A1 * | 3/2005 | Jeannerod | ............. | 455/41.2 |
| 2005/0070336 A1 * | 3/2005 | Tamura | ............. | 455/567 |
| 2009/0075697 A1 * | 3/2009 | Wilson et al. | ............. | 455/557 |
| 2010/0216401 A1 * | 8/2010 | Kitahara | ............. | 455/41.2 |

OTHER PUBLICATIONS

TREO 650 smartphone. Using Dial-up Networking, user's manual, by palmOne, 2004.*

* cited by examiner

*Primary Examiner* — Olumide T Ajibade Akonai

(57) ABSTRACT

A system and method of a Dial-Up Networking (DUN) approach is disclosed. The DUN system authenticates a wireless network between a portable electronic device and a control module. The DUN system includes the portable electronic device, a transceiver, and the control module. A wireless service carrier is associated with the portable electronic device. The control module includes control logic for determining the wireless service carrier associated with the portable electronic device. The control module further includes control logic for establishing the wireless network connection between the control module and the portable electronic device.

20 Claims, 2 Drawing Sheets

AUTO CONFIGURATION FOR A DIAL-UP NETWORKING SYSTEM

FIELD

The present invention relates to a Dial-Up Networking (DUN) system and method, and in particular to a DUN system and method for communicating a wireless cellular signal from a personal electronic device to a control module using a wireless network connection.

BACKGROUND

The statements in this section merely provide background information related to the present disclosure and may or may not constitute prior art.

A personal electronic device such as, for example, a smartphone typically has the capability to send and receive data over a wireless cellular network as well as a short-range wireless network. The wireless cellular network can be any type of wireless network allowing a telecommunication device to transmit and receive speech and data signals through a transmitting tower. The short-range wireless network is any type of wireless signal intended for creating personal area networks between electronic devices that are in proximity to one another. One example of a short-range wireless network is a Bluetooth® wireless signal. Dial-Up Networking (DUN) is one approach that can be used for establishing a wireless connection in an Internet-ready device, such as a laptop computer, using both the wireless cellular network and the short-range wireless network. The personal electronic device obtains data over the wireless cellular network. The DUN approach allows for data from the personal electronic device to be transmitted to the Internet-ready device over the short-range wireless network.

One drawback of using the DUN approach is that it can be relatively time consuming and complex to establish a connection between the Internet-ready device and the personal electronic device. This is because the DUN approach requires a user to enter detailed configuration information, such as a username, password, and a dial-up number that are specific to their wireless cellular provider before a DUN connection can be established. Some users do not know the information, or how to obtain the information. Therefore, all of the necessary configuration information needed to establish the DUN connection is not provided, which can lead to warranty claims and technical support requests. Also, some users may decide not to utilize the DUN approach at all if they believe it is too time consuming to enter the configuration information. Accordingly, there is a need in the art for a system that will provide a quicker and less complex approach for establishing a DUN connection between an Internet-ready device and a personal electronic device.

SUMMARY

The present invention provides a system and method for a Dial-Up Networking (DUN) connection for authenticating a wireless network connection to a wireless service carrier associated with a portable electronic device utilizing a DUN configuration parameter. The DUN system includes a transceiver and a control module. The transceiver is in bi-directional communication with the portable electronic device to establish a data connection. The control module has a memory and is in bi-directional communication with the transceiver to send and receive information from the data connection. The control module includes a first control logic for associating a plurality of values with the DUN configuration parameter. The memory of the control module includes the plurality of values associated with the DUN configuration parameter. The control module further includes a second control logic determining the wireless service carrier associated with the portable electronic device. The control module further includes a third control logic for selecting one of the plurality of values associated with the DUN configuration parameter. Selection of one of the plurality of values is based on the wireless service carrier associated with the portable electronic device. The control module fourth a third control logic for associating the selected one of the plurality of values of associated with the DUN configuration parameter into the field. The control module also includes a fifth control logic establishing the wireless network connection between the control module and the portable electronic device, where associating the selected one of the plurality of values associated with the DUN configuration parameter authenticates the short-range wireless network connection.

In yet another embodiment of the present invention, the control module includes a sixth control logic for monitoring the data connection from the transceiver.

In still another embodiment of the present invention, the data connection from the transceiver includes information indicating the wireless service carrier associated with the portable electronic device. The second control logic of the control module determines the wireless service provider based on information from the data connection from the transceiver.

In yet another embodiment of the present invention, the DUN system comprises a display unit, where the control module includes a seventh control logic for generating a graphical data signal that is shown on the display unit.

In still another embodiment of the present invention, the graphical data signal represents the value of the DUN configuration parameter.

In yet another embodiment of the present invention, a user input control is in communication with the control module. The user input control receives external input and communicates the external input to the control module.

In still another embodiment of the present invention, the external input includes data indicating the wireless service carrier. The control module includes a seventh control logic for receiving the external input and determining the wireless service carrier based on the external input.

In yet another embodiment of the present invention, the value of the DUN configuration parameter is at least one of a user name, a password, and a Dial Up number.

In still another embodiment of the present invention, a plurality of DUN configuration parameters are used to authenticate the short-range wireless signal connection.

In yet another embodiment of the present invention, the control module is one of an infotainment module, a telematics module and a human machine interface (HMI) module of a vehicle.

In still another embodiment of the present invention, the data connection between the control module and the portable electronic device is a short-range wireless signal based on the IEEE Standard 802.15.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
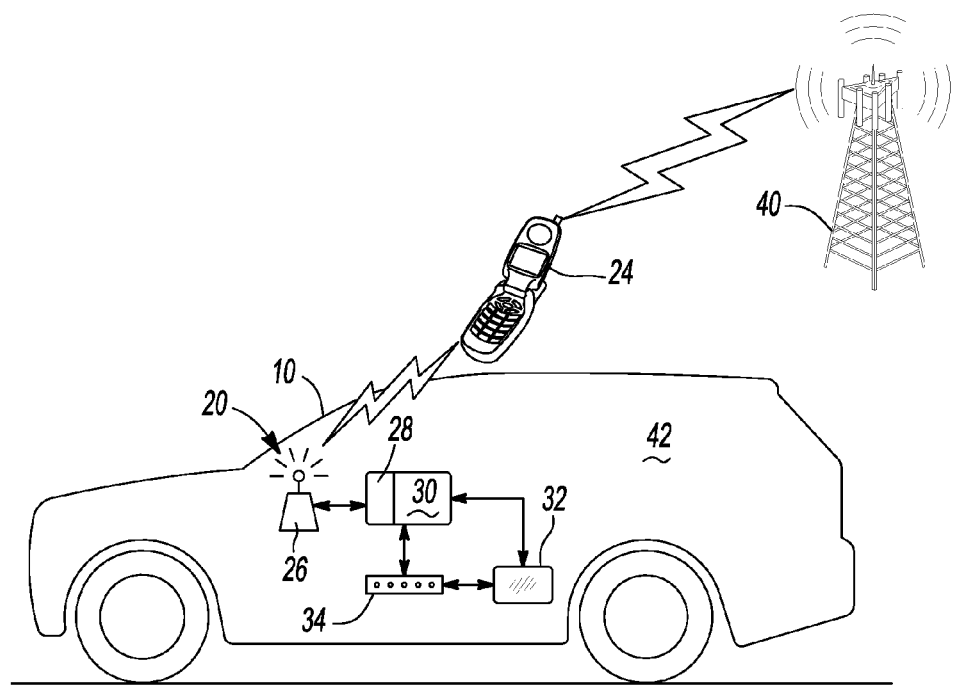
FIG. 1 is a schematic illustration of an exemplary vehicle having a DUN system, where the DUN system includes a control module that is in communication with a portable electronic device.

The following description is merely exemplary in nature and is not intended to limit the present disclosure, application, or uses. With reference to FIG. 1, a schematic view of a vehicle is generally indicated by reference number 10, where an exemplary Dial-Up Networking (DUN) system 20 for establishing a wireless network connection is connected to the vehicle 10. The DUN system 20 includes a personal electronic device 24, an antenna 26, a transceiver 28, a control module 30, an in-vehicle display 32 and a user input control 34. In the embodiment as illustrated, the antenna 26, the transceiver 28, the control module 30, the in-vehicle display 32, and the user input control 34 are each integrated or connected with the vehicle 10, and the personal electronic device 24 is a stand-alone or separate device.

The portable electronic device 24 is any type of portable electronic device capable of sending and receiving radio frequency (RF) signals from an external RF source 40. Specifically, the portable electronic device 24 sends and receives RF signals from the external RF source 40 in a form compatible with a wireless cellular network. The wireless cellular signals allow for simultaneous use of speech and data services. In one embodiment, the wireless cellular signals comply with fourth generation wireless standards (4G network), however it is understood that other types of mobile communication frequency signals could be used such as, for example, third generation mobile communication wireless standards. In the embodiment as shown the portable electronic device 24 is a smartphone, however it is understood that other types of portable electronic devices such as, for example, a personal navigation device (PND) may be used as well.

The external RF device 40 is any type of structure capable of transmitting and receiving RF signals, and is located in the environment outside of an interior cabin 42 of the vehicle 10. In the example as illustrated the external RF device is a cellular telephone tower. The external RF device 40 is operated by at least one wireless service provider. The wireless service provider can be any type of cellular provider that providers speech and data services such as, for example, Verizon Wireless®, T-Mobile®, AT&T® or Sprint®. In one embodiment, the RF signals sent from the external RF source 40 to the personal electronic device 24 contain information indicating the wireless service provider that is associated with the personal electronic device 24. For example, if the personal electronic device 24 uses Verizon Wireless® as the wireless service carrier, the RF signal sent from the external RF device 40 to the personal electronic device 24 includes data indicating that Verizon Wireless® is the wireless service provider.

The personal electronic device 24 further includes circuitry and/or software (not shown) for converting RF signals compatible with a wireless cellular network into RF signals compatible with a short-range wireless network. The RF signals compatible with a short-range wireless network can be any type of wireless signal intended for short-range usage such as, for example, a Bluetooth® wireless communication standard based on the IEEE Standard 802.15.

In addition to being in bi-directional communication with the external RF device 40, the personal electronic device 24 is also in bi-directional communication with the antenna 26 of the vehicle 10. The antenna 26 is connected to the transceiver 28. In one embodiment, the antenna 26 could be integrated with the transceiver 28. The antenna 26 allows for a data connection to be established between the portable electronic device 24 and the transceiver 28. The transceiver 28 is any device capable of sending and receiving RF signals. The transceiver 28 also includes circuitry and/or software for demodulating RF signals into non-modulated signals as well as circuitry and/or software for modulating non-modulated signals into RF signals. The antenna 26 allows for the transceiver 28 to transmit and receive RF signals to and from the personal electronic device 24. Specifically, the antenna 26 is sized to transmit and receive short-range wireless network signals that are emitted from the personal electronic device 24. The transceiver 28 receives the short-range wireless signals from the antenna 26 and demodulates the short-range wireless communication signals into non-modulated signals. Thus, the transceiver 28 of the vehicle 10 receives data sent by external RF device 40 through the personal electronic device 24. In the embodiment as shown, the transceiver 28 is integrated with the control module 30, however it is understood that the transceiver 28 and the control module 30 may be separate components as well.

Figure 2:
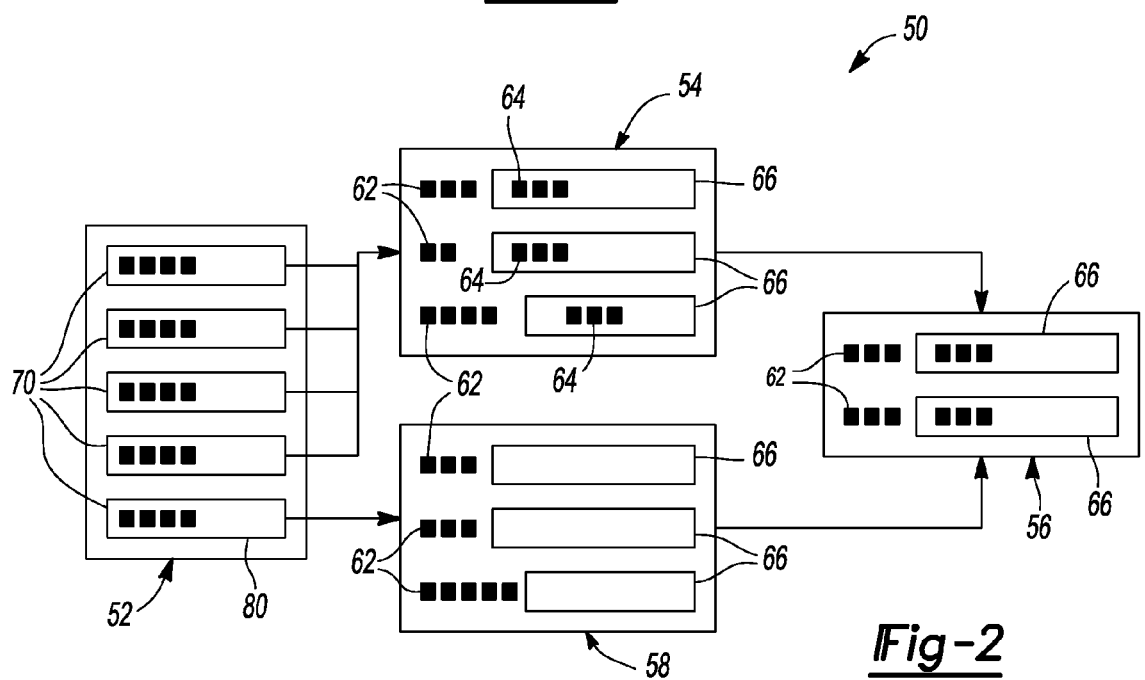
FIG. 2 is a diagram of a DUN configuration profile that is stored in a memory of the control module illustration in FIG. 1.

The control module 30 is preferably an electronic control device having a preprogrammed digital computer or processor, control logic, memory used to store data, and at least one I/O peripheral. The control logic includes a plurality of logic routines for monitoring, manipulating, and generating data. The control module 30 is any type of control module having a memory for storing and supporting a DUN configuration profile such as, for example, an infotainment module, a telematics module or a human machine interface (HMI) module of a vehicle. It is also understood that although FIG. 1 illustrates the control module 30 connected to the vehicle 10, the control module 30 could also be used in a variety of Internet-ready devices as well, such as, for example, an Internet-ready television set. Turning to FIG. 2, the reference number 50 refers to a DUN configuration profile stored in the memory of the control module 30. The DUN configuration profile 50 is used to automatically configure and authenticate the short-range wireless network connection between the control module 30 and the portable electronic device 24.

Referring back to FIG. 1, the control module 30 sends and receives non-modulated signals from the transceiver 28. The control module 30 is in communication with the display 32. In the embodiment as illustrated, the display 32 is a screen such as, for example, a liquid crystal display (LCD) that electronically displays graphics such as text, images, and moving pictures. The display 32 is located in an area that can be viewed by a driver such as, for example, in the center console (not shown) located within the interior cabin 42 of the vehicle 10. The display 32 is used to show graphical data generated by the control module 30 such as, for example, Internet webpages or moving pictures. The display 32 is also in communication with the user input control 34. The user input control 34 is a device for receiving external input from a user, and communicating the external input to the control module 30. In one embodiment, the user input control 34 includes tactile controls for a user to manipulate such as, for example, pushbuttons or a keyboard. In an alternative embodiment, the user input control 34 is a voice-activated system that includes a microphone for detecting a user's voice. The user input control 34 then sends the external input in the form of electronic signals to the control module 30. The control module 30 is in communication with both the display and the user input control 34. The control module 30 includes control logic for converting the electronic signals received from the user input control 34 into graphical data that produces images shown on the display 32.

Turning now to FIG. 2, an illustration of the DUN configuration profile 50 is shown having a first screen 52, a second screen 54, a third screen 56, and a fourth screen 58. A list of possible wireless service carriers 70 are listed on the first screen 52. The DUN configuration profile 50 also includes a plurality of DUN configuration parameters 62 that are listed on the second, third and fourth screens 54, 56, 58. A value 64 is associated with each DUN configuration parameter 62. Specifically, each DUN configuration parameter 62 includes a field 66, where the value 64 is entered into the field 66. Each value 64 entered into the field 66 of the DUN configuration parameter 62 is used to authenticate the short-range wireless network connection between the portable electronic device 24 and the control module 30. The value 64 of the DUN configuration parameter 62 depends on which wireless service carrier 70 is associated with the portable electronic device 24. In the embodiment as shown, the DUN configuration parameters 62 include a User Name, a password, and a Dial Up Number. In one embodiment, the value 64 for the User Name is based on the assigned user name of the individual associated with the portable electronic device 24. Alternatively, the User Name could also be based on the ten digit telephone number that is associated with the portable electronic device 24. For example, if the portable electronic device 24 has a telephone number of 555-555-1212 and a wireless service carrier 70 of Verizon Wireless®, then the User Name would be 5555551212@vzv3g.com. In another example, if the wireless service carrier 70 is Sprint®, and if the assigned user name is john.doe, then the User Name would be john.doe@sprintpcs.com. The value 64 for the password is typically a string of characters that depend on the wireless service carrier 70 of the portable electronic device 24. For example, if Verizon Wireless® is the wireless service carrier 70 of the portable electronic device 24, then the password would be 'vzv'. The value 64 for the Dial Up Number depends on the wireless service carrier 70 of the portable electronic device 24. For example, if Verizon Wireless® is the wireless service carrier 70 of the portable electronic device 24, then the Dial Up Number would be #777.

The control module 30 (shown in FIG. 1) includes control logic for monitoring the transceiver 28 (shown in FIG. 1) for non-modulated data signals. The control module 30 further includes control logic for determining the wireless service carrier 70 of the portable electronic device 24. The non-modulated data signal received from the transceiver 28 includes data indicating which wireless service carrier 70 is associated with the portable electronic device 24. In one approach, the control module 30 includes control logic for determining the wireless service carrier associated with the portable electronic device 24. With this approach, a user does not need to manually select which wireless service carrier 70 is associated with the portable electronic device 24. However, sometimes the control module 30 is unable to determine the wireless service carrier 70 from the non-modulated signal.

In one embodiment, if the control module 30 is unable to determine the wireless service carrier, a user can still manually select which wireless service provider 70 is associated with the portable electronic device 24. Referring back to FIG. 1, a user may manually enter the name of the wireless service carrier 70 using the display 32 and the user input control 34. Specifically, the display 32 may show the first screen 52 (shown in FIG. 2). The user may then select the appropriate wireless service carrier 70 by manipulating the user input control 34. In another embodiment, if the wireless service provider is not listed on the first screen 52, then a user may have to manually enter all of the values 64. Referring the first screen 52, an option 80 labeled "Other" is selected by a user if the wireless service provider is not listed. This selection will then bring up the fourth screen 58, which allows for a user to manually enter information into the fields 66.

Referring to both FIGS. 1-2, the memory of control module 30 stores the specific values 64 of the corresponding DUN configuration parameters 62 for each of the wireless service carriers 70 that are listed on the first screen 52. For example, if the wireless cellular carrier of the portable electronic device 24 is determined to be Verizon Wireless®, the memory of the control module 30 would contain data indicating that the ten digit telephone number of the portable electronic device 24 is 555-555-1212. The control module 30 further includes control logic for retrieving the value 64 of the DUN configuration parameter from the memory of the control module 30. The control module 30 also includes control logic for entering or populating the value 64 of the DUN configuration parameter 62 into the corresponding field 66. Specifically, referring to FIG. 2, the control logic of the control module 30 enters each of the values 64 into the corresponding field 66 of the DUN configuration parameter 62. Entering the value 64 into the field 66 of the DUN configuration parameter 62 authenticates the short-range wireless network connection between the control module 30 and the portable electronic device 24. Thus, a data connection is established between the control module 30 and the portable electronic device 24.

Referring to FIGS. 1-2, the control module 30 may include control logic for generating graphical data that shows at least the first screen 52 of the DUN configuration profile 50 on the display 32. In one embodiment, the second and third screens 54 and 56 are not shown on the display 32, and remain hidden to a user. In an alternative embodiment, the control module 30 includes control logic for generating graphical data that shows at least one of the second and third screens 54 and 56 on the display 32. In another embodiment, only the second screen 54 is shown on the display 32. In this embodiment, the control module 30 includes control logic for generating graphical data on the display 32 representative of the second screen 54. The control module 30 also includes control logic for showing a message on the display 32 that indicates whether the values 64 should be confirmed or rejected. A user may confirm or reject the values 64 using the user input control 34. In an alternative embodiment, only the third screen 56 is shown on the display 32, where a user confirms their DUN configuration parameters 62 by manually entering the values 64 into the fields 66. It should be noted that while the DUN system 20 includes DUN configuration parameters 62 for a User Name, Password, and Dial Up Number, those skilled in the art will appreciate that other types of DUN configuration parameters may be included as well. For example, the DUN configuration parameters can be customized or personalized depending on their vehicle identification number (VIN) or the Bluetooth® address.

The control module 30 of the DUN system 20 includes control logic that automatically enters or populates the fields 66 of the DUN configuration profile 50. In some other types of DUN systems, a user manually enters the values of the DUN configuration parameters. Some users do not know or believe that it is too time-consuming and tedious to enter all of the DUN configuration parameters. If a user does not enter the correct DUN configuration parameters the short-range wireless network connection can not be established. One advantage of the DUN system 20 is that the control module 30 includes an algorithm that automatically establishes the short-range wireless network connection with limited or no input from a user.

In one embodiment, the DUN configuration parameters 62 stored in the memory of the control module 30 can be uploaded and updated periodically during the vehicle's lifecycle to ensure that the DUN configuration parameters 62 are accurate. The control module 30 may include control logic for periodically monitoring and updating the DUN configuration parameters 62 if needed. The control module 30 obtains the data needed for the update through a wireless data connection such as, for example, the vehicle's OnStar® system.

Figure 3:
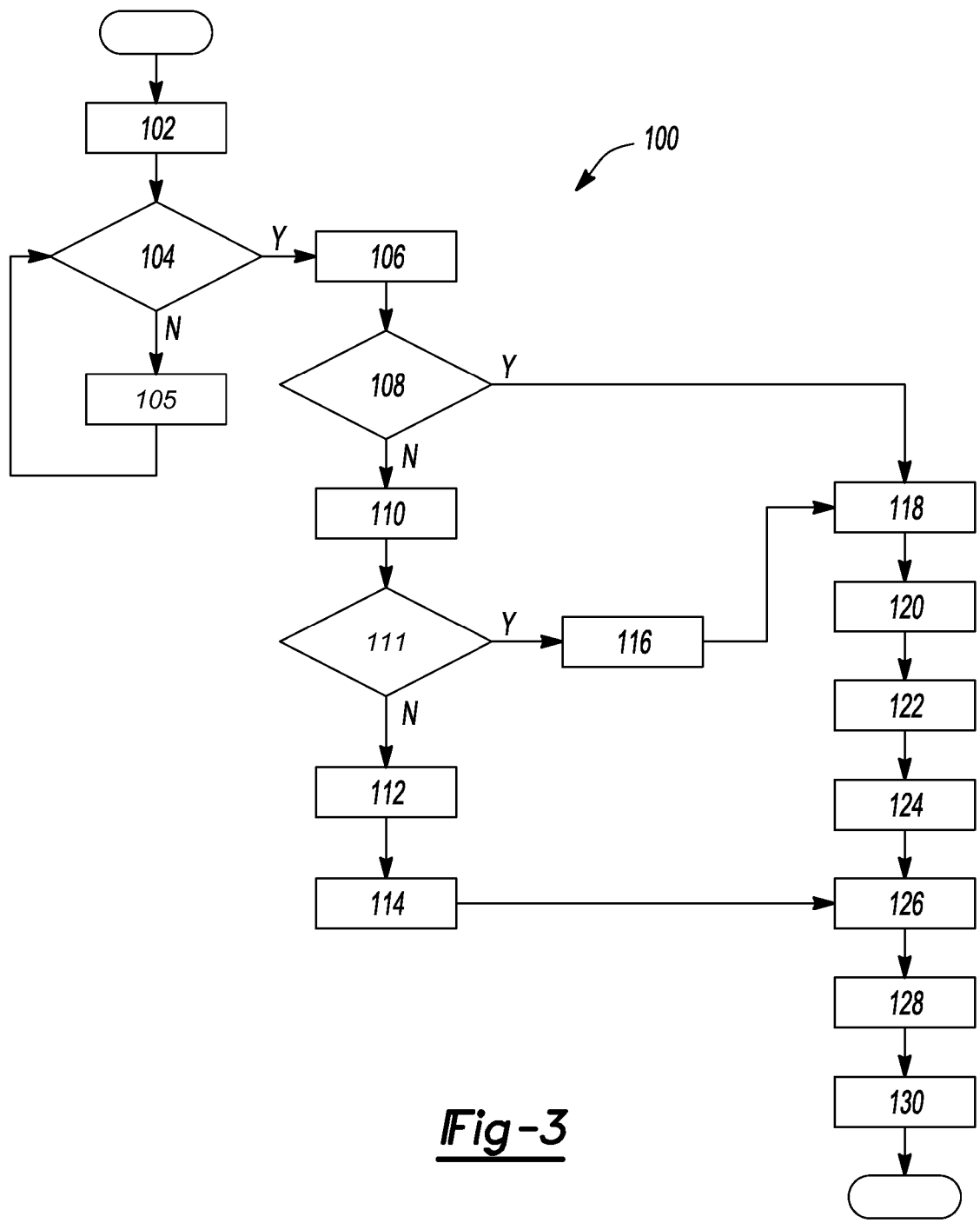
FIG. 3 is a flow diagram illustrating a method of setting up the DUN configuration profile to establish a network connection between the control module and the portable electronic device.

Turning now to FIG. 3, and with continued reference to FIGS. 1-2, a method of authenticating a short-range wireless network using a DUN system 20 is generally indicated by reference number 100. The method 100 begins at step 102, where a wireless cellular signal is provided. In one embodiment, the wireless cellular signal is provided by an external RF device 40, which is illustrated as a cellular telephone tower. The external RF device 40 is operated or associated with at least one wireless service provider. The method 100 may then proceed to step 104.

In step 104, the method 100 determines if a portable electronic device 24 is provided, where the portable electronic device 24 receives the wireless cellular signal from the external RF device 40. If a portable electronic device 24 is not provided, the method 100 remains at step 104 until a portable electronic device 24 is provided at step 105. Once the portable electronic device 24 is provided and a connection between the external RF device 40 and the portable electronic device 24 is established, the method proceeds to step 106.

In step 106, a control module 30 of the DUN system includes control logic for monitoring a non-modulated data signal emitted from a transceiver 28. The non-modulated data signal includes data indicating the wireless service carrier of the portable electronic device 24. The DUN system 20 includes an antenna 26 that is connected to the transceiver 28, and the portable electronic device 24 includes circuitry for converting the wireless cellular signal provided by the external RF device 40 into a short-range wireless signal. The transceiver 26 receives the short-range wireless signals from the portable electronic device 24 through the antenna 26 and demodulates the short-range wireless communication signals into the non-modulated data signals. The control module 30 receives the non-modulated data signal from the transceiver 28. The non-modulated data signal may include data indicating the wireless service carrier that is associated with the portable electronic device 24. Method 100 may then proceed to step 108.

In step 108, the control module 30 determines the wireless service carrier of the portable electronic device 24. The control module 30 includes control logic for determining the wireless service carrier. In one embodiment, the control module 30 includes control logic for determining the wireless service carrier based on data received from the non-modulated data signal. If the control module 30 successfully determines the wireless service carrier based on the non-modulated data signal, then method 100 proceeds to step 118. If the control module 30 is unable to determine the wireless service carrier based on the non-modulated signal, then method 100 proceeds to step 110.

In step 110, the control module 30 includes control logic for displaying a list of wireless service carriers on a display 32. Referring specifically to FIG. 2, a first screen 52 of a DUN configuration profile 50 displays a list of wireless service providers 70. At step 111, the method 100 determines if the wireless service provider 70 specific to the portable electronic device 24 is shown on the display 32. If the wireless service provider 70 specific to the portable electronic device 24 is not shown on the display 32, then method 100 proceeds to step 112. In step 112, the control module includes control logic for displaying the fourth screen 58, where fields 66 of the DUN configuration parameters 62 are blank and have no values entered into the fields 66. In step 114, a user may then manually enter values into the field 66. Method 100 may then proceed to step 126.

If the wireless service provider 70 associated with the portable electronic device 24 is shown on the display 32, method 100 may proceed to step 116. In step 116, a user manually selects the wireless service provider 70 using a user input control 34. Method 100 may then proceed to step 118.

In step 118, the control module 30 includes control logic for selecting one of the values 64 associated with the DUN configuration parameter 62 into the field 66. Specifically, referring to FIG. 2, the memory of control module 30 stores the specific values 64 of the corresponding DUN configuration parameters 62 for each of the wireless service carriers 70 that are listed on the first screen 52, and the control logic selects one of the values 64. Selection of the value 64 associated the DUN configuration parameter 62 is dependent on the wireless service carrier. The method 100 may then proceed to step 120.

In step 120, the control module 30 includes control logic for entering or populating the value 64 of the DUN configuration parameter 62 into the field 66. Method 100 may then proceed to step 122.

In step 122, the control module 30 includes control logic for generating graphical data that shows the second and third screens 54 and 56 on the display 32. The fields 66 show the values 64 of the DUN configuration parameters 62 that are generated by the control logic of the control module 30. A user is able to view the values 64 on the display 32. Method 100 may then proceed to step 124.

In step 124, the control module 30 includes control logic for generating graphical data on the display 32 that indicates whether the values 64 should be confirmed or rejected. A user may confirm or reject the values 64 using the user input control 34. Method 100 may then proceed to step 126.

In step 126, the control module 30 includes control logic for establishing the short-range wireless network connection between the control module 30 and the portable electronic device 24. Entering the value 64 into the field 66 of the DUN configuration parameter 62 authenticates the short-range wireless network connection between the control module 30 and the portable electronic device 24. Once the short-range wireless network connection is established, method 100 may then proceed to step 128.

In step 128, the control module 30 includes control logic for establishing additional DUN configuration parameters. In addition to the DUN configuration parameters 62 for a User Name, Password, and Dial Up Number, other types of DUN configuration parameters may be used as well to authenticate the short-range wireless network connection between the control module 30 and the portable electronic device 24. For example, the DUN configuration parameters can be customized or personalized depending on such factors such as the vehicle identification number (VIN) or the Bluetooth® address. Method 100 may then proceed to step 130.

In step 130, data is sent over the short-range wireless network connection between the portable electronic device 24 and the control module 30. The short-range wireless network connection provides the control module 30 with Internet access. For example, data representative of an Internet webpage could be sent from the external RF device 40 in the form of wireless cellular signals. The portable electronic device 24 converts the wireless cellular signals into short-range wireless signals. Data is then sent over the short-range wireless network connection from the portable electronic device 24 to the antenna 26, and to the transceiver 28. The transceiver 28 converts the short-range wireless signals into non-modulated data signals. The non-modulated data signals are then sent to the control module 30. The control module 30 includes control logic for converting the non-modulated data signals into data representative of graphical images. This data is sent to the display 32. The Internet webpage is then shown on the display 32. Method 100 may then terminate.

The description of the invention is merely exemplary in nature and variations that do not depart from the gist of the invention are intended to be within the scope of the invention. Such variations are not to be regarded as a departure from the spirit and scope of the invention.

What is claimed is:

1. A Dial-Up Networking (DUN) system for authenticating a wireless network connection to a wireless service carrier associated with a portable electronic device utilizing a DUN configuration parameter, the DUN system comprising:
    a transceiver in bi-directional communication with the portable electronic device to establish a data connection; and
    a control module having a memory, wherein the control module is in bi-directional communication with the transceiver to send and receive information provided by the data connection, and wherein the control module includes:
        a first control logic for associating a plurality of values with the DUN configuration parameter, wherein the memory of the control module stores the plurality of values associated with the DUN configuration parameter;
        a second control logic for determining the wireless service carrier associated with the portable electronic device;
        a third control logic for selecting one of the plurality of values associated with the DUN configuration parameter, wherein selection of one of the plurality of values is based on the wireless service carrier;
        a fourth control logic for associating the selected one of the plurality of values with the DUN configuration parameter; and
        a fifth control logic for establishing the wireless network connection between the control module and the portable electronic device, wherein associating the selected one of the plurality of values with the DUN configuration parameter authenticates the wireless network connection.

2. The DUN system of claim 1 wherein the control module includes a sixth control logic for monitoring the data connection from the transceiver.

3. The DUN system of claim 2 wherein the data connection from the transceiver includes information indicting the wireless service carrier associated with the portable electronic device, and wherein the second control logic of the control module determines the wireless service carrier based on information from the data connection from the transceiver.

4. The DUN system of claim 1 further comprising a display unit, wherein the control module includes a seventh control logic for generating a graphical data signal that is shown on the display unit.

5. The DUN system of claim 4 wherein the graphical data signal represents the selected one of the plurality of values of the DUN configuration parameter.

6. The DUN system of claim 4 further comprising a user input control that is in communication with the control module, wherein the user input control receives an external input and communicates the external input to the control module in the form of an electronic signal.

7. The DUN system of claim 6 wherein the electronic signal includes data indicating the wireless service carrier, and wherein the control module includes an eighth control logic for determining the wireless service carrier based on the electronic signal.

8. The DUN system of claim 1 wherein the plurality of values associated with the DUN configuration parameter are one of a user name, a password, and a Dial-Up number.

9. The DUN system of claim 1 wherein a plurality of DUN configuration parameters are used to authenticate the wireless network connection.

10. The DUN system of claim 1 wherein the control module is one of an infotainment module, a telematics module and a human machine interface (HMI) module of a vehicle.

11. The DUN system of claim 1 wherein the data connection between the control module and the portable electronic device utilizes a short-range wireless signal based on the IEEE Standard 802.15.

12. A method of authenticating a Dial-Up Networking (DUN) system, the DUN system connected to a wireless service carrier associated with a portable electronic device utilizing a DUN configuration parameter, the DUN system including a control module and a transceiver where the transceiver is in bi-directional communication with the portable electronic device to establish a data connection and the control module is in bi-directional communication with the control module, the method comprising:
    associating a plurality of values with the DUN configuration parameter, wherein a memory of the control module stores the plurality of values associated with the DUN configuration parameter;
    determining the wireless service carrier associated with the portable electronic device;
    selecting one of the plurality of values associated with the DUN configuration parameter, wherein selection of one of the plurality of values is based on the wireless service carrier;
    associating the selected one of the plurality of values with the DUN configuration parameter; and
    establishing the wireless network connection between the control module and the portable electronic device, wherein associating the selected one of the plurality of values with the DUN configuration parameter authenticates the wireless network connection.

13. The method of claim 12 further comprising monitoring the data connection from the transceiver.

14. The method of claim 13 further comprising determining the wireless service carrier based on information from the data connection from the transceiver, wherein the data connection from the transceiver includes information indicting the wireless service carrier associated with the portable electronic device.

15. The method of claim 12 further comprising generating a graphical data signal that is shown on a display unit.

16. The method of claim 15 further comprising representing the selected one of the plurality of values of the DUN configuration parameter as the graphical data signal.

17. The method of claim 15 further comprising receiving external input from an external source to a user input control, wherein the under input control is in communication with the control module, and wherein the external input is communicated from the user input control to the control module in the form of an electronic signal.

18. The method of claim 17 further comprising determining the wireless service carrier based on the electronic signal, wherein data indicating the wireless service carrier is included with the electronic signal.

19. The method of claim 12 further comprising communicating a short-range wireless signal based on the IEEE Standard 802.15, wherein the data connection between the control module and the portable electronic device utilizes the short-range wireless signal.

20. A Dial-Up Networking (DUN) system for authenticating a wireless network connection to a wireless service carrier associated with a portable electronic device utilizing a DUN configuration parameter, the DUN system comprising:
  a transceiver in bi-directional communication with the portable electronic device to establish a data connection that is a short-range wireless signal based on the IEEE Standard 802.15; and
  a control module having a memory, wherein the control module is in bi-directional communication with the transceiver to send and receive information from the data connection, and wherein the control module includes:
    a first control logic for associating a plurality of values with the DUN configuration parameter, wherein the memory of the control module stores the plurality of values associated with the DUN configuration parameter;
    a second control logic for monitoring the data connection from the transceiver, wherein the data connection from the transceiver includes information indicting the wireless service carrier associated with the portable electronic device;
    a third control logic for determining the wireless service carrier associated with the portable electronic device, wherein the control module determines the wireless service carrier based on information from the data connection from the transceiver;
    a fourth control logic for selecting one of the plurality of values associated with the DUN configuration parameter, wherein selection of one of the plurality of values is based on the wireless service carrier;
    a fifth control logic for associating the selected one of the plurality of values with the DUN configuration parameter; and
    a sixth control logic for establishing the wireless network connection between the control module and the portable electronic device, wherein associating the selected one of the plurality of values with the DUN configuration parameter authenticates the wireless network connection.

* * * * *